April 23, 1929.　　J. W. FOWLER　　1,710,535
MEANS IN THE FEED LINE FOR PREVENTING
THE FORMATION OF SCALE IN A BOILER
Filed Nov. 9, 1926
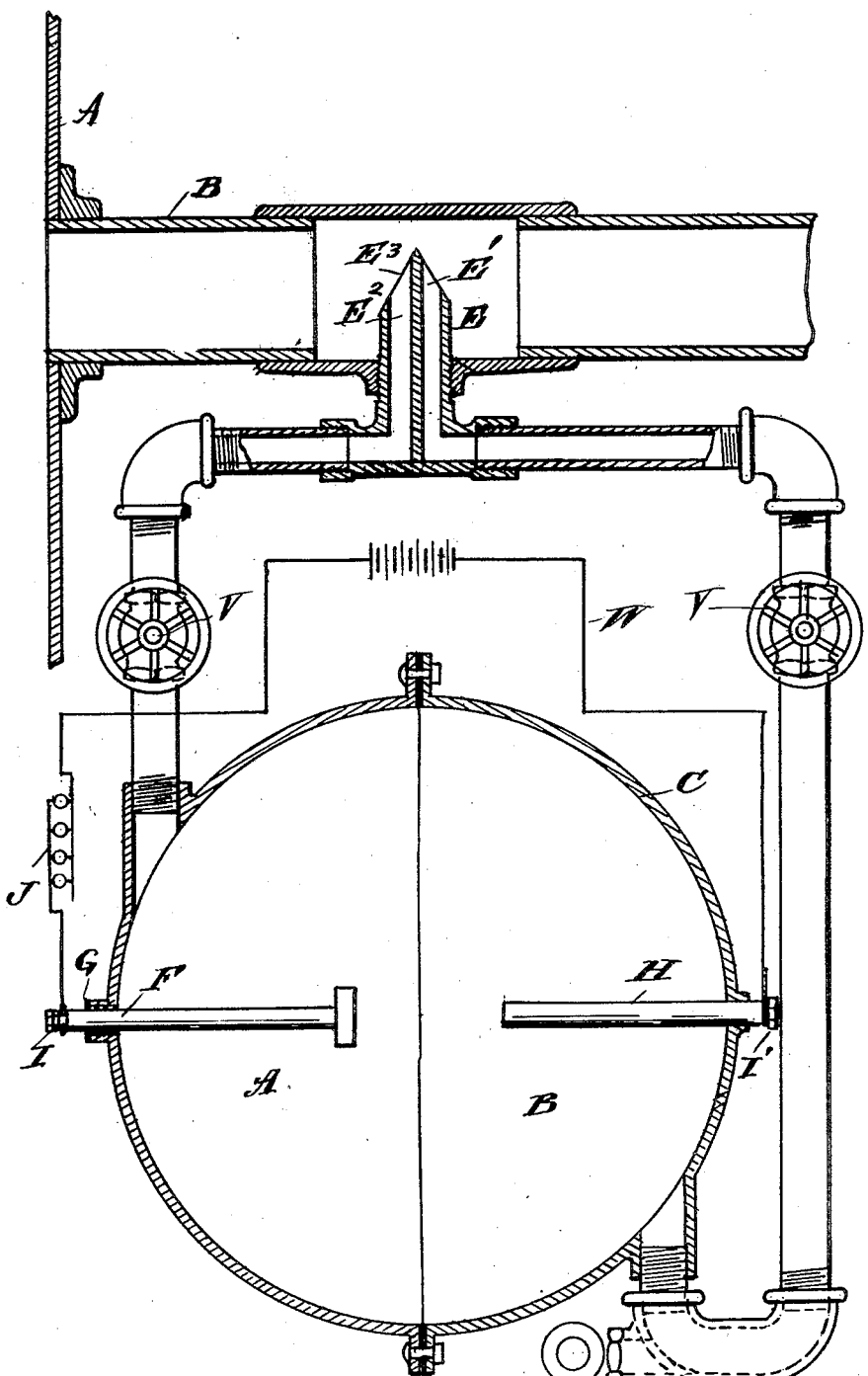

Patented Apr. 23, 1929.

1,710,535

UNITED STATES PATENT OFFICE.

JOHN W. FOWLER, OF CLEVELAND, OHIO.

MEANS IN THE FEED LINE FOR PREVENTING THE FORMATION OF SCALE IN A BOILER.

Application filed November 9, 1926. Serial No. 147,344.

The objects of the invention are to provide an electrically acting process and means, for preventing the formation of scale in a steam boiler, by withdrawing a portion of the feed water for the boiler from the feed pipe into a separate chamber, and subjecting the water therein to the action of an electric current before returning it to the feed pipe, whence it is carried with the feed water to the boiler. It has been found that when a small portion of the feed water has been subjected to the action of the electric current, the water will be decomposed and the hydrogen gas thus liberated will be dissipated with the steam while the remaining oxygen will combine with the scale forming material in the boiler which may be sulphate of magnesia or lime, thus causing the mineral substances to become oxydized and to be deposited as mud or slime in the bottom of the boiler, where they are easily removed, and are not caused to adhere as scale to the sides of the boiler.

Thus by the ionization of a small portion of the fuel water enough oxygen will be liberated to break up the sulphates in the boiler and prevent their being deposited as a hard scale thereon.

Also in this manner the boiler is preserved from the direct action of the electric current which exerts a constant tendency to oxidize and corrode the walls at the points entered by the electrodes or terminals of the electric circuit. In this process no additional or scale dissolving chemical is employed, and no electrical action of any kind takes place in the boiler, but the decomposition of some of the feed water takes place in a chamber wholly external to the boiler, and the ionized liquid passes thence into the boiler, where the oxygen freed by ionization will immediately combine with the scale producing material.

In the accompanying drawings, Fig. 1 is a vertical, central section of the device. In these views A is the boiler, B is the feed pipe, C is the auxiliary chamber, E, E² are T-shaped Pitot tubes separated by a central partition, one E having its upper opening, E', turned in the direction of the incoming flow of the water, and the other having its upper opening E³ turned toward the boiler.

The inlet pipe E enters one end of the chamber C from beneath the same, and the other pipe E² communicates with the opposite end at the upper side thereof.

At F is shown the anode, which comprises a metal terminal passing through the insulation G in the wall of the chamber.

H is the cathode, which comprises a metal terminal screwed into the opposite wall of the chamber.

Each terminal is provided with wire clamping means such as nuts I, I', for the attachment of the circuit wires W, which may be in a lighting or other circuit.

The chamber may be constructed of two similar parts for convenience in assembling the parts, and for economy in construction.

The anode may be of any convenient shape, but it is preferably provided with an enlarged head to insure the electrolytic action.

In case a lighting circuit is employed, the strength of the circuit may be reduced by means of a transformer, J, if necessary; and the size of the Pitot tubes should be proportional to the amount of flow through the feedpipe and the strength of the current employed. Hence valves V, V, are employed to regulate the flow of water therethrough.

The electrolytic action of the current will decompose water containing mineral bases, such as lime, mineral salts, or sulphuric acid, in the chamber, and will separate these elements from the water; and water thus treated, when introduced into the boiler, will prevent the deposition upon the walls of the boiler of collections of these elements.

Having described the invention, what I claim as new and desire to secure by Letters Patent is:

1. In a device of the class described, the combination of a boiler and feed pipe therefor, of an auxiliary chamber, beneath the same, means for deflecting a continual flow of water from said feed pipe through said chamber into said boiler, comprising, a union inserted in said feed pipe, a T shaped tube inserted vertically into said union, and having a central vertical partition, and having its inner end reversely cut away on opposite sides, to form oppositely facing openings, and supply pipes connecting the opposite outer ends of said tube respectively with the upper and lower portions of said chamber and means for producing electrolytic action upon the current of water while flowing through said tube and chamber.

2. In a device for the purpose described, the combination with the feed pipe of a boiler, and an auxiliary chamber spaced therefrom, of a union introduced into said feed pipe, a T shaped Pitot tube extending vertically into said union, and having a central vertical partition separating the inlet and outlet openings therein, the horizontal extremities of said T shaped tube communicating, one with the lower end of said chamber, and the other with the upper end thereof, an anode of an electric circuit horizontally and adjustably extended into said chamber, and insulated from the wall thereof, and an apposed uninsulated cathode in the opposite wall thereof.

In testimony whereof I hereunto affix my signature.

JOHN W. FOWLER.